(12) United States Patent
Stirn

(10) Patent No.: US 6,533,972 B1
(45) Date of Patent: Mar. 18, 2003

(54) METHOD APPARATUS FOR EJECTOR SET-UP

(75) Inventor: Andrew K. Stirn, West Harrison, IN (US)

(73) Assignee: Uniloy Milacron USA, Inc., Manchester, MI (US)

( * ) Notice: Subject to any disclaimer, the term of this patent is extended or adjusted under 35 U.S.C. 154(b) by 0 days.

(21) Appl. No.: 09/499,284

(22) Filed: Feb. 7, 2000

(51) Int. Cl.⁷ .............................................. B29C 33/44
(52) U.S. Cl. ...................... 264/40.5; 264/334; 425/139; 425/444
(58) Field of Search ........................... 264/40.5, 328.1, 264/334; 425/139, 556, 444

(56) References Cited

U.S. PATENT DOCUMENTS

| 5,599,486 A | * | 2/1997 | Fujishiro et al. ............. 264/334 |
| 5,639,486 A | | 6/1997 | Yamaguchi .................. 425/139 |
| 5,718,930 A | | 2/1998 | Stengel ........................ 425/556 |
| 5,736,079 A | * | 4/1998 | Kamiguchi et al. .......... 264/334 |
| 5,804,224 A | | 9/1998 | Inaba et al. .................. 425/150 |
| 5,932,164 A | | 8/1999 | Allen ......................... 264/328.1 |
| 6,183,235 B1 | * | 2/2001 | Taniguchi et al. ........... 425/139 |

* cited by examiner

Primary Examiner—Jill L. Heitbrink
(74) Attorney, Agent, or Firm—John W. Gregg

(57) ABSTRACT

Method and apparatus for control of an ejector mechanism of a molding machine. A procedure is executed without operator intervention for setting limits for controlling motion of movable members of mold assemblies, the movable members linked to ejector pins communicating with the mold cavity and used to assure molded articles are dislodged from a mold element. The procedure, typically associated with a "set-up" mode of control, operates an ejector mechanism with reduced force to drive the movable members to the extremes of travel thereof, senses a "stalled" condition at each extreme, and causes measured position of each extreme to be recorded. Position values intended for use in normal (program controlled) operation of the molding machine are derived from the recorded position values.

18 Claims, 3 Drawing Sheets

METHOD APPARATUS FOR EJECTOR SET-UP

BACKGROUND OF THE INVENTION

I. Field of the Invention

This invention relates to molding machines, more particularly, to ejector mechanisms commonly used in molding machines. The invention is directed particularly to setting travel limits for ejector mechanisms.

II. Description of Related Art

In molding machines, plastically deformable material to be molded is formed in cavities defined by mating mold sections and allowed to cure to a state wherein the material will not unacceptably deform upon removal from the mold cavity. The cured material defines molded articles that are removed from the machine upon separation of the mating mold sections. However, as it is common that articles will adhere to one of the mold sections, it is typical to provide ejector pins communicating with the mold cavity and linked to movable members in the mold assembly comprising the mating mold sections. Motion of the ejector pins is effective to dislodge molded articles from the mold section, assuring their complete removal. The movable members are typically translatable and include links to the ejector pins to move them between retracted positions whereat their free ends are flush with mold cavity surfaces and forward positions whereat the free ends protrude into the mold cavity.

From U.S. Pat. No. 5,639,486 it is known to provide for calibration of a control of an ejector mechanism to establish a position value corresponding to or derived from an ejector retract travel extreme. In accordance with this patent, the ejector mechanism is controlled to retract to the travel extreme where motion is mechanically restrained and record a representation of position corresponding to the travel extreme. To prevent overloading the ejector mechanism, the retraction is stopped on detection of cessation of motion by a mechanical restraint ("stopper"). The ejector may be advance away from the stopper a predetermined distance "L" to define a "calibration completion position".

As mold cavity depths vary according to the articles being produced, the translation of movable members required to dislodge articles varies accordingly. Although the calibration technique known from U.S. Pat. No. 5,639,486 is suitable for establishing a coordinate value associated with a retract position, known procedures for establishing stroke length for ejector mechanisms require data entry by a user having access to information concerning a mold assembly. Consequently, errors in setting of values for control of ejectors can result, and such errors may cause malfunctions of ejector mechanisms, triggering alarms and/or damaging machine or mold elements. Consequently, there is a need for improved methods for setting ejector mechanism stroke lengths that overcome the deficiencies of known methods.

SUMMARY OF THE INVENTION

It is an object of the present invention to provide improved methods and apparatus for setting program controlled stroke length of ejector mechanisms for molding machines.

It is a further object of the present invention to provide an improved method for setting stroke length of an ejector mechanism of a molding machine wherein coordinate values of advance and retract end points are determined and recorded without operator intervention.

Further objects and advantages of the invention shall be made apparent from the accompanying drawings and the following description thereof.

In accordance with the aforesaid objects the present invention provides a method for setting a program controlled stroke length of an ejector mechanism of a molding machine. The ejector mechanism imparts translation to movable members of a mold assembly, the movable members being linked to ejector pins communicating with a mold cavity defined by mating mold sections. A procedure is performed under program control to effect definition of ejector travel limit position information. To limit forces generated during execution of the limit setting procedure, the procedure causes setting of an ejector actuator control parameter to limit useful force produced by the ejector actuator. The procedure then causes the ejector mechanism to be driven to advance the movable members to the extremes of their travel range, in each direction, motion being ceased as a result of physical restraint. Travel limit position information is defined in response to detection of restraint of motion at the travel range extremes. The definition of travel limit positions for both forward and rearward travel limits establishes an ejector stroke length adapted to the peculiarities of the mold assembly.

DETAILED DESCRIPTION OF THE PREFERRED EMBODIMENT

To illustrate the invention, a preferred embodiment as implemented for an injection molding machine shall be described. It is contemplated that the invention could as well be applied to other molding machines, such as, but not limited to blow molding machines.

Figure 1:
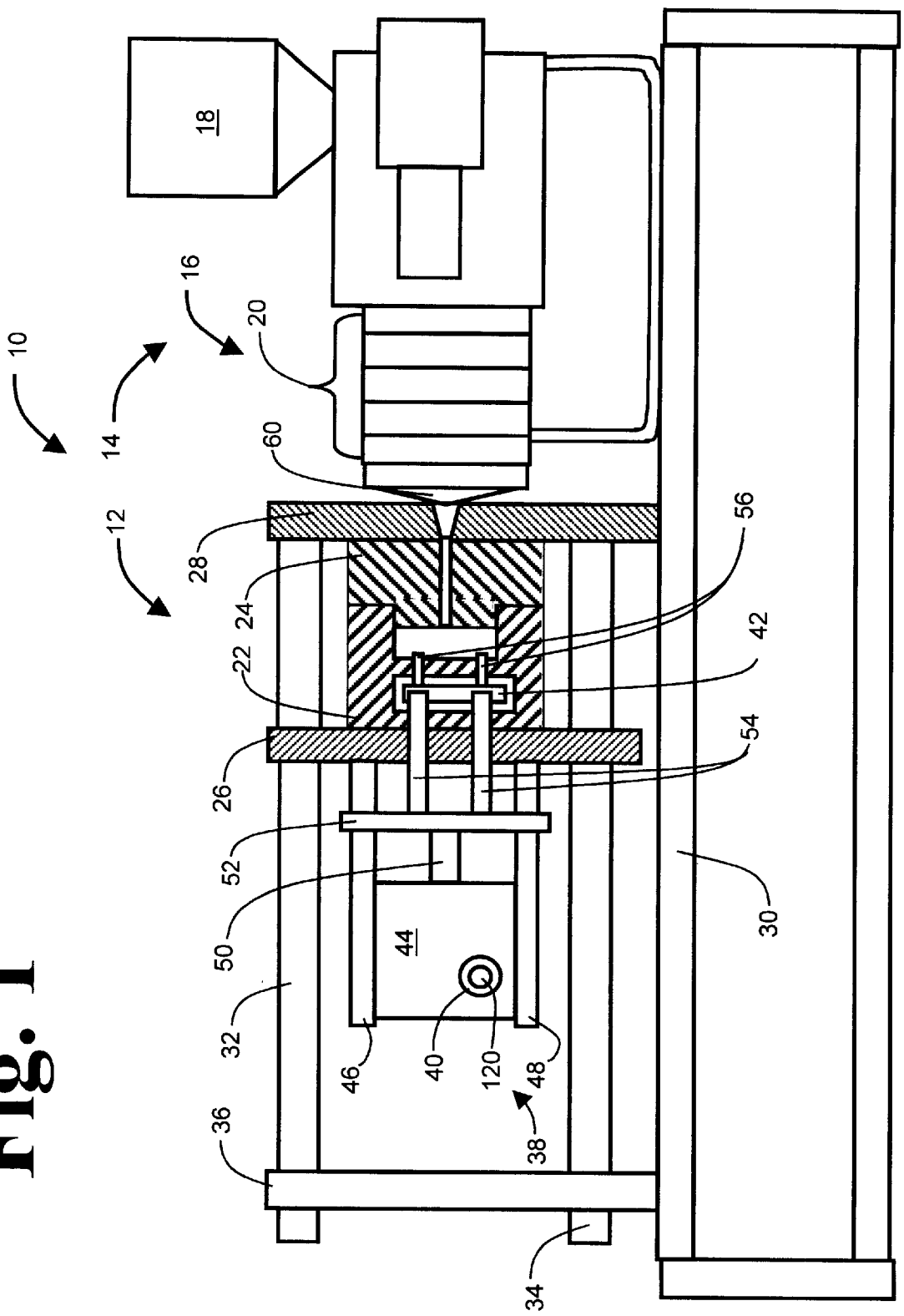
FIG. 1 is a schematic diagram of an injection molding machine with a power operated ejector mechanism.

Referring to FIG. 1, injection molding machine 10 includes a clamp assembly 12 and injection unit 14. Typical of plastic injection molding machines, raw material in the form of pellets and/or powders is introduced to an extruder 16 through hopper 18. Extruder 16 includes a barrel portion 60, typically surrounded by external heating elements 20, and an internal material working screw, not shown. As raw material is plasticized by a combination of heating and material working, the plasticized material advances toward the exit end of the extruder, displacing the interior screw away from clamp assembly 12. Once a sufficient volume of material has been plasticized, the working screw is advanced within barrel portion 60 to force material through the exit end of barrel portion 60 into a cavity defined by mating mold sections 22 and 24. Clamp assembly 12 holds mold sections 22 and 24 together during injection and thereafter until the injected material has sufficiently solidified to be removed without unacceptable deformation. Movable platen 26 is then retracted, separating mold section 22 from mold section 24 to permit release of the molded article.

Continuing with reference to FIG. 1, clamp assembly 12 comprises fixed platen 28, movable platen 26, thrust or "die height" platen 36 and a mechanism for effecting translation of movable platen 26, such as a toggle mechanism (not shown). Forces required to overcome separation forces acting on mold sections 22 and 24 during injection are generated by the toggle mechanism in reaction with strain rod pairs 32 and 34 supported at opposite ends by fixed platen 28 and thrust platen 36.

Continuing with reference to FIG. 1, movable members 42, within mold section 22, are connected to ejector pins 56 that communicate with the mold cavity defined by mating mold sections 22 and 24. Movable members 42 comprise a plate as illustrated by FIG. 1, and additional couplings, guides, springs, and the like as are known to movably support the plate within the mold assembly, connect the plate with connecting rods 54 of ejector mechanism 38 and connect the plate with ejector pins 56. The number, size(s) and placement of ejector pins 56 are chosen according to characteristics of the article(s) defined by the mold cavity. Displacement of movable members 42 away from movable platen 26 advances ejector pins 56 to cause the free ends thereof to protrude beyond the surfaces of mold section 22 intersected by their respective axes of motion, such protrusion, or like repeated protrusions, being effective to dislodge an article from mold section 22. While shown in FIG. 1 as intersecting a vertical flat surface, the mold cavity surfaces at the points of intersection with ejector pins 56 may be curved and/or at various angles. The free ends of ejector pins 56 are made to conform to the mold cavity surface at the points of intersection therewith so that when ejector pins 56 are retracted, the free ends thereof are flush with the mold cavity surfaces. While it is known to provide mechanical linkages to effect translation of movable members 42 with separation of mold sections 22 and 24, it is also known to provide power operated ejector mechanisms to improve the effectiveness of ejector pins 56 to dislodge articles.

A power operated ejector mechanism 38 is illustrated in FIG. 1 disposed between thrust platen 36 and movable platen 26. Ejector mechanism 38 effects translation of movable members 42 in mold section 22. Ejector mechanism 38 includes transmission 44, motor 40, ejector arm 50, ejector plate 52, and ejector connecting rods 54. Motor 40 drives transmission 44 to effect translatory motion of ejector arm 50. Transmission 44 is fixably supported by mounting rods or brackets 46 and 48 attached to movable platen 26. Motor 40 is mounted to and supported by transmission 44. Hence, transmission 44 and motor 40 move with movable platen 26. Advantageously, ejector plate 52 may be slidably supported by support rods 46 and 48, will move with movable platen 26, and will move relative to movable platen 26 with translation of ejector arm 50. Connecting rods 54 are slidably supported by movable platen 26 and connect ejector plate 52 with movable members 42. In consequence of the connection of ejector plate 52 with movable members 42, translation of ejector arm 50 effects translation of movable members 42 relative to movable platen 26. While plural connecting rods 54 are illustrated in FIG. 1, it is contemplated that ejector mechanism 38 may comprise a single connecting rod coupled to an ejector actuator or ejector arm without an interposed ejector plate.

As shown in FIG. 1, motor 40 is a rotating machine, wherein an armature and stator are arranged for rotation of one relative to the other. As is conventional, motor 40 is preferably a servo-motor and includes or works in combination with a position measuring transducer 120 which measures relative angular position. Also, as is well known for control of servo motors, other transducers may be used with motor 40 to measure, for example, angular velocity or to detect motor element relative locations for motor current commutation. Transmission 44 converts rotation of the armature of motor 40 to translation of ejector arm 50 along its length. The motion conversion of transmission 44 and the operation of transducer 120 are such that position of ejector arm 50 within its range of translatory motion can be unambiguously determined from measurement of angular position by position transducer 120. In the configuration illustrated in FIG. 1, position transducer 120 may be an angular position encoder.

It is known to use linear actuators to effect translatory motion of connecting rods 54. Hence, ejector mechanism 38 may alternatively comprise a linear electric motor or linearly operating hydraulic actuator and suitable coupling devices to propel connecting rods 54. Further, position transducer 120 could be a linearly operating transducer used to directly measure linear position of a translating motor armature, linear displacement of ejector plate 52, or linear displacement of connecting rods 54. Irrespective of the nature of transducer 120, it is effective to measure position representative of position of movable members 42 and, hence, representative of position of ejector pins 56.

The desired range of motion of movable members 42 is that motion from the point at which the free ends of ejector pins 56 are flush with surfaces of portions of the mold cavity defined by mold section 22 to a point at which the free ends of ejector pins 56 protrude sufficiently beyond such surfaces to be effective to dislodge an article from mold section 22. As the range of motion desired for movable members 42 depends on characteristics of movable members 42, and ejector pins 56, it is necessary to control operation of motor 40 so as to define a stroke length of ejector mechanism 38 matched to the desired range of motion of movable members 42.

Figure 2:
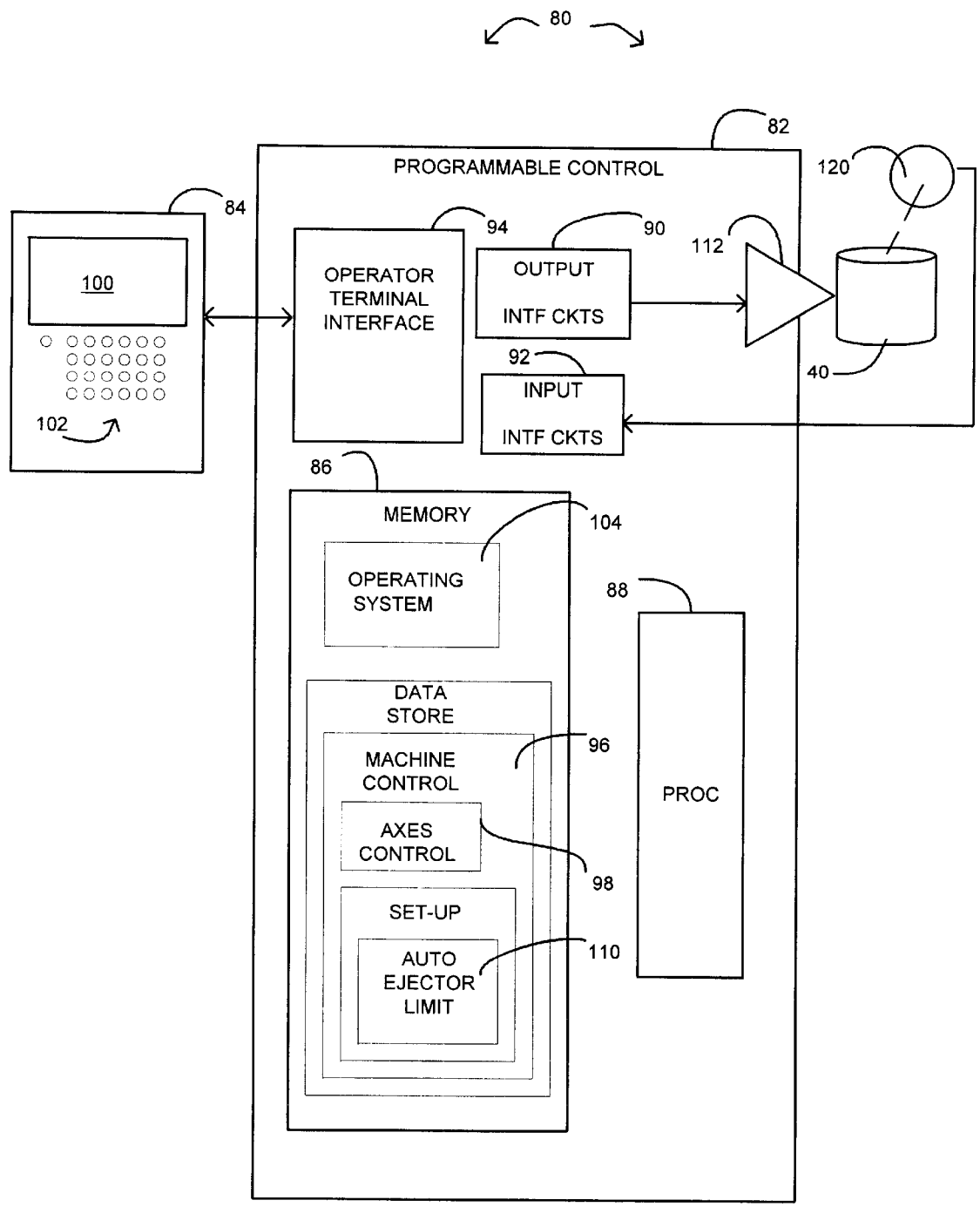
FIG. 2 is a block diagram of a control system for the injection molding machine of FIG. 1.

A control system for the injection molding machine shown in FIG. 1 shall be described with reference to FIG. 2. Control system 80 includes a programmed controller 82, such as, for example, a programmable logic controller or personal computer based control system, and an operator terminal 84 including a display 100 and input devices 102 such as keys, push buttons, computer "mouse", and the like and data reading and recording devices such as magnetic tape drives, diskette drives, and magnetic strip or stripe card reading drives. Programmed controller 82 includes operator terminal interface circuits 94, memory 86, one or more processors indicated by processor 88, output interface circuits 90, and input interface circuits 92. Operator terminal interface 94 includes circuits for controlling display of data on operator terminal 84 and for translating between signals used by processor 88 and signals used by input devices 102. Memory 86 may include non-volatile memory such as semiconductor read only memory (ROM), volatile memory such as semiconductor random access memory (RAM), and mass storage devices such as disk memory. Processor 88, typically, one or more digital processors, executes programs recorded in memory to process input signals, perform logical and arithmetic functions, and produce output signals to control the operation of machine devices. Input and output interface circuits 90 and 92 may include electrical and optical devices for translating between the digital electrical signals used by processor 88 and the digital and analogue electrical signals used by machine devices. Machine control 80 produces signals for controlling the operation of motor 40. Output signals defining, for example, position, velocity, and/or acceleration are applied to motor drive 112 to control electrical current delivered to motor 40 from a suitable power source such as a conventional three-phase alternating current source. As is conventional, motor drive 112 uses signals produced by position transducer 120 and/or other transducers in connection with the control of current delivered to motor 40.

Functions performed by programmed controller 82 are controlled by operating system programs 104 which may be recorded in ROM or otherwise stored in memory 86. Operating system programs may be entirely dedicated to particular programmed controller hardware or may comprise commercially available operating systems for personal computers such as, for example, a WINDOWS operating system available from Microsoft Corp. Operating system programs 104 typically include programmed facilities for management of hardware resources and control the execution of machine control programs 96 by processor 88. Machine control programs 96 perform logical and arithmetic functions to monitor and control the operation of machine devices. Typically, such programs permit at least two modes of operation of the machine: (i) an automatic mode for normal production; and (ii) a set-up or manual mode, for preparing the machine and machine devices for production and for setting parameter values used by the machine control programs in production of particular articles from particular material. While the automatic mode of operation will cause motion of machine members in accordance with values established by the user during machine set-up, the set-up mode permits manually controlled motion of machine members. Hence, routines for control of machine actuators, known as axes control routines, may be used to effect controlled motion in both automatic and manual or set-up modes of operation.

The present invention is concerned with a particular aspect of machine set-up, that is, establishment of values of travel limits for ejector mechanism 38 to limit the range of motion of connecting rods 54 to the desired range of motion of movable members 42, thereby establishing a program controlled stroke length for ejector pins 56. The operator selects a set-up mode of operation via operator terminal 84. With set-up mode selected, the operator may invoke automated ejector limit setting, causing execution of ejector limit setting programs 110 recorded in memory 86.

Figure 3:
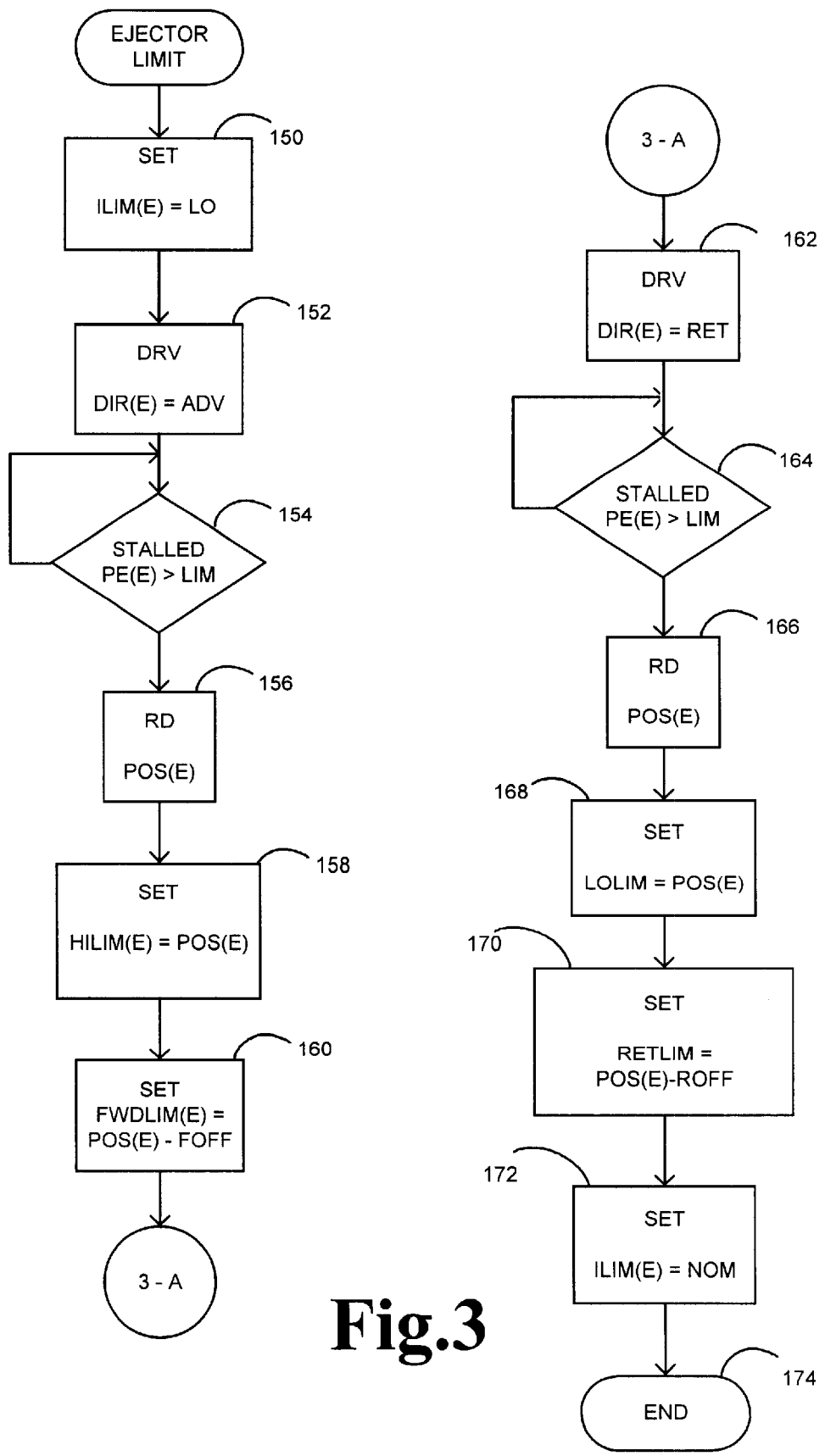
FIG. 3 is a flow chart of a procedure used by the control system of FIG. 1 to set ejector travel limits.

Description of the functions of ejector limit setting programs 110 shall be made with reference to the flow chart of FIG. 3. At step 150, an ejector actuator control parameter is set to limit the useable force (torque) produced by the ejector actuator, in the preferred embodiment, a motor current limit value for motor 40 (ILIM(E)) is set to a low value (LO). As the automatic limit setting procedure relies on physical restraint of movable members 42 at the extremes of their travel range, setting of the motor current limit value assures that sufficient force can be generated to propel movable members 42 and ejector pins 56, without producing excessive strain on mechanical components at the travel extremes.

Continuing with reference to FIG. 3, at step 152, motor 40 is driven in the direction to translate movable members 42 away from movable platen 26 and toward the ejector forward extreme. Decision step 154 represents a program execution delay waiting for detection of a "stalled" condition of motor 40, i.e., a condition in which further motion is prevented notwithstanding control of motor 40 to continue motion. With position controlled servo motors, a "stalled" condition is advantageously determined by the servo position error, i.e. difference between commanded and measured position, exceeding a limit value (PE(E)>LIM). Alternatively, a "stalled" condition may be determined by detecting the absence of change of position indicated by transducer 120 over a predetermined interval while motor 40 is controlled to effect motion. While awaiting detection of the stalled condition, further execution of the procedure of FIG. 3 is inhibited. To insure that an indefinite delay does not occur, a timer is advantageously associated with this decision step that, on expiration of a predetermined period, will cease further execution of the procedure and cause display of a fault message at display 100 for the operator.

Under the circumstances established by the procedure of FIG. 3, a first "stalled" condition will occur when movable members 42 are restrained from further motion at the ejector forward extreme (most distant from movable platen 26) of the ejector travel range. With detection of a first "stalled" condition, motor 40 is controlled to cease motion and actual position of the ejector mechanism (POS(E)) is read from transducer 120 at step 156. At step 158, the value of the ejector forward extreme (HILIM) is set equal to the position read at step 156. At step 160, the value of the ejector forward travel limit (FWDLIM) is calculated by subtracting a forward offset value (FOFF) from the position read at step 156. The forward travel limit value is the value that will be used to control normal operation of the ejector mechanism during program controlled operation of the injection molding machine. Consequently, the offset value is chosen to allow for variables such as dimensional changes in components of movable members 42 whether induced mechanically, as with compression of springs, or thermally, as with transfer of heat during operation, and motion overshoot that may be encountered in normal machine operation. Conversely, the ejector forward extreme (HILIM) corresponds to the forward mechanical restraint, which, in normal operation, would be reached only in the event of a fault, and is associated with presentation of an alarm message on display 100 or other programmed response to occurrences of motion faults.

Following step 160, execution of ejector limit setting programs 110 continues through on-page connector 3-A at process step 162 where motor 40 is controlled to retract movable members 42, i.e., to propel movable members 42 toward movable platen 26 and the ejector rearward extreme. Decision step 164 represents detection of a second "stalled" condition of motor 40, under these circumstances, corresponding to physical restraint of movable members 42 at the ejector rearward extreme of ejector travel range. Decisions step 164, like decision step 154, will inhibit further execution of ejector limit setting programs 110 pending occurrence of the second "stalled" condition. In a like manner, a timer is advantageously associated with decision step 164 to prevent an indefinite delay of further program execution. With detection of a second "stalled" condition, motor 40 is controlled to cease rearward motion and actual position of the ejector mechanism (POS(E)) is read from transducer 120 at step 166. At step 168, the value of the ejector rearward extreme (LOLIM) is set equal to the position read at step 166. As with the ejector forward extreme, the ejector rearward extreme is associated with the rearward mechanical restraint and, in normal operation, would be reached only in the event of a fault. At step 170, the value of the ejector rearward travel limit (RETLIM) is calculated by subtracting a rearward offset value (ROFF) from the position read at step 166. The rearward travel limit value is the value that will be used to control normal operation of the ejector mechanism during program controlled operation of the injection molding machine.

At step 172 the value of motor current limit for motor 40 is set equal to a nominal value used in normal operation of ejector mechanism 38. This completes setting of travel limits for ejector mechanism 38 and execution of the ejector limit setting procedure ends at terminal 174.

During program controlled operation of injection molding machine 10, ejector mechanism 38 is controlled by use of the forward limit (FWDLIM(E)) and rearward limit values (RETLIM(E)). These values define the stroke length effected by ejector mechanism 38, and consequently of ejector pins 56. By virtue of the procedure used to establish the forward and rearward limit values, the stroke length is defined without operator intervention.

Successful removal of articles from mold section 22 may require repeated reciprocation of movable members 42. As is well known, the number of operations of ejector mechanism 38 may be set so that during execution of a single normal cycle of operation of injection molding machine 10, ejector pins 56 will advance and retract repeatedly, potentially repeatedly impacting molded articles retained in mold section 22 to dislodge them therefrom. As the forward and rearward travel limits established by the ejector limit setting programs 110 limit travel of movable members to less than the extremes of travel range, the present invention is effective to reduce wear and tear on ejector components that would otherwise be produced by such repetitive operation.

While the invention has been described with reference to a preferred embodiment, and while the preferred embodiment has been illustrated and described with considerable detail, it is not the intention of the inventors that the invention be limited to the detail of the preferred embodiment. Rather, it is intended that the scope of the invention be defined by the appended claims and all equivalents thereto.

What is claimed is:

1. A method for setting program controlled travel limits of an ejector mechanism of a molding machine, the ejector mechanism providing propulsion for movable members of a mold assembly, the movable members being connected to ejector pins effective to dislodge molded articles from a mold section, the method comprising:

a) setting an ejector actuator control parameter to limit useable force produced by the actuator;

b) driving the ejector actuator to advance the movable members toward an ejector forward extreme whereat advance is mechanically restrained;

c) defining an ejector forward travel limit in response to detecting a first stalled condition of the ejector actuator associated with the ejector forward extreme;

d) driving the ejector actuator to retract the movable members toward an ejector rearward extreme whereat retraction is mechanically restrained;

e) defining an ejector rearward travel limit in response to detecting a second stalled condition of the ejector actuator associated with the ejector rearward extreme.

2. The method of claim 1 further comprising the step of recording measured position of the ejector forward extreme in response to detecting the first stalled condition of the ejector actuator.

3. The method of claim 2 wherein the step of defining an ejector forward travel limit further comprises the step of calculating an ejector forward travel limit value by subtracting a forward offset value from the recorded position corresponding to the ejector forward extreme.

4. The method of claim 1 further comprising the step of recording measured position of the ejector rearward extreme in response to detecting the second stalled condition of the ejector actuator.

5. The method of claim 4 further comprising the step of calculating an ejector rearward travel limit value by subtracting a rearward offset value from the recorded position corresponding to the ejector rearward extreme.

6. The method of claim 1 wherein the first and second stalled conditions of the ejector actuator are determined by detecting cessation of change of measured position over a predetermined period while the ejector actuator is controlled to effect motion of the movable members.

7. An apparatus for setting program controlled travel limits of an ejector mechanism of a molding machine, the ejector mechanism providing propulsion for movable members of a mold assembly, the movable members being linked to ejector pins, motion of the ejector pins effective to dislodge molded articles from a mold section, the apparatus comprising:

a) an ejector actuator for operating the ejector mechanism to effect motion of the movable members;

b) a position transducer for measuring position representative of position of the ejector pins; and c) a programmed controller for controlling the ejector mechanism, the controller setting an ejector actuator control parameter to limit useable force produced by the actuator, driving the ejector actuator to advance the movable members toward an ejector forward extreme whereat advance is mechanically restrained, defining a forward travel limit in response to detecting a first stalled condition of the ejector actuator associated with the ejector forward extreme, driving the ejector actuator to retract the movable members toward an ejector rearward extreme whereat retraction is mechanically restrained, and, defining a rearward travel limit in response to detecting a second stalled condition of the ejector actuator associated with the ejector rearward extreme.

8. The apparatus of claim 7 wherein the programmed controller further comprises a processor and the programmed controller causes an ejector position value to be recorded in response to detecting the first stalled condition and the processor calculates the forward travel limit value by subtracting a forward offset value from the position recorded at the ejector forward extreme.

9. The apparatus of claim 8 wherein the programmed controller causes an ejector position value to be recorded in response to detecting the second stalled condition and the processor further calculates the retract travel limit value by subtracting a retract offset from the position value recorded at the ejector rearward extreme.

10. The apparatus of claim 7 wherein the ejector actuator is a rotating machine and the ejector mechanism further comprises a transmission for converting rotary motion of the actuator to translatory motion.

11. The apparatus of claim 10 wherein the position transducer is a rotary encoder coupled to the ejector actuator.

12. The apparatus of claim 7 wherein the position transducer is a linear transducer coupled to the movable members.

13. The apparatus of claim 7 wherein the ejector actuator is a linear actuator.

14. The apparatus of claim 7 wherein the ejector actuator is an electrical motor and the programmed controller sets a current limit value to limit useable force produced by the ejector actuator.

15. The apparatus of claim 7 wherein the programmed controller comprises a personal computer based control system comprising commercially available operating system programs.

16. The apparatus of claim 15 wherein the programmed controller further comprises machine control programs for controlling the operation of the molding machine.

17. The apparatus of claim 16 wherein the machine control programs comprise axes control programs for effecting position controlled motion of the ejector actuator.

18. The apparatus of claim 16 wherein the machine control programs provide a set-up mode of operation of the molding machine, and the set-up mode of operation includes a programmed procedure to effect the setting of program controlled travel limits of the ejector mechanism.

* * * * *